United States Patent [19]

D'Luzansky

[11] Patent Number: 4,464,064

[45] Date of Patent: Aug. 7, 1984

[54] TEMPERATURE CONTROL MONITOR

[75] Inventor: John S. D'Luzansky, Franklin, Ohio

[73] Assignee: Packaging Industries, Inc., Hyannis, Mass.

[21] Appl. No.: 369,403

[22] Filed: Apr. 19, 1982

[51] Int. Cl.³ .................. G01K 3/02; G01K 11/12
[52] U.S. Cl. .................. 374/101; 116/307; 235/89 R; 374/162; 374/109
[58] Field of Search .......... 374/1, 161, 162, 159, 374/109, 101, 116; 235/89 R; 248/DIG. 4; 377/21, 25; 116/DIG. 47

[56] References Cited

U.S. PATENT DOCUMENTS

| | | | |
|---|---|---|---|
| 1,421,275 | 6/1922 | Masac | 374/101 |
| 2,308,087 | 1/1943 | Lappala | 374/162 |
| 3,661,142 | 5/1972 | Flam | 374/162 |
| 3,898,354 | 8/1975 | Parker | 374/162 X |
| 4,019,368 | 4/1977 | Navato | 374/162 |
| 4,150,570 | 4/1979 | Fuller | 73/73 X |
| 4,154,104 | 5/1979 | Worthington | 374/109 X |
| 4,156,365 | 5/1979 | Heinmets et al. | 374/162 |
| 4,246,785 | 1/1981 | Sellers et al. | 374/159 X |
| 4,279,152 | 7/1981 | Crossland | 374/162 |
| 4,377,948 | 3/1983 | Tenney, Jr. | 377/21 |
| 4,409,844 | 10/1983 | Schweiso | 73/861 |

FOREIGN PATENT DOCUMENTS 2079951 1/1982 United Kingdom .............. 374/108

Primary Examiner—Daniel M. Yasich
Attorney, Agent, or Firm—Brumbaugh, Graves, Donohue & Raymond

[57] ABSTRACT

A temperature control cost monitor and method uses temperature responsive means with a visible display calibrated in terms of percentage savings or increased costs above and below a standard temperature. The display can be a temperature sensitive liquid crystal array and overlay with transparent percentage indicia, a liquid height thermometer with associated percentages indicated on or adjacent the thermometer, or another temperature indicator calibrated in this way. The calibrations are based on the climate in which the monitor is used. The monitor can indicate savings and excess cost of both heating in winter and air conditioning in summer.

9 Claims, 3 Drawing Figures

TEMPERATURE CONTROL MONITOR

BACKGROUND OF THE INVENTION

This invention relates to monitors and methods for indicating energy costs for heating and/or cooling, and more particularly to temperature sensitive monitors calibrated in percentage of savings or excess costs above or below a particular standard temperature.

Turning the thermostat down in the winter and up in summer effects a reduction in overall heating or cooling costs by reducing the amount of energy used. For example, one living in Ohio and keeping the thermostat at 63° F. instead of 68° F. reduces heating cost about 17 percent. Whereas, in the past, thermostats, and room temperature thermometers have been calibrated in temperature, either degrees Fahrenheit or Celsius, these have not indicated the savings or additional costs above and below a particular room temperature.

BRIEF SUMMARY OF THE INVENTION

In accordance with this invention, a temperature control cost monitor includes a temperature responsive device or means having a visible indication dependent on temperature and means calibrating the visible indication in terms of percentage savings and percentage of excess energy costs below and above a preselected temperature. The means that calibrates the visible display can include indicia indicating increasing percentages above and below the preselected standard temperature, which is itself calibrated at 0%.

In one instance, the visible temperature indication is provided by an array of temperature responsive liquid crystals with varying visible characteristics dependent on temperature. Their color, reflectance or other visible characteristic changes at or about a particular temperature. An overlay sheet calibrated in translucent or transparent percentage indicia is provided in association with the crystal array, and as the visible characteristic of the crystals change, one or more of the percentage indicia becomes more visible to indicate percentage savings or percentage of increased cost with respect to the preselected standard temperature.

Other embodiments of the invention include a liquid height thermometer with associated indicia indicating percentages of energy saving or excess cost above and below a particular temperature, and a dial type thermometer indicator and means calibrating the face of the dial to this end. In the latter embodiment, the dial can include a doubled ended pointer with one end pointing to costs savings, or excess costs for heating and the other end pointing to savings or excesses for cooling.

In accordance with the method of the invention, the properly calculated excess costs and fuel saving are associated with a temperature responsive indicator with a visible display indication. Calibration of the monitor includes indicating percentage or excess cost above and below the selected temperature for the particular climate where the monitor is used. The percentage savings in reducing the temperature a given amount will effect a different percentage saving in, for example, a northern state as compared to a middle or southern. This difference is taken into account and, by appropriate calibration, the corect indicia is shown on the face of the monitor for its particular climate.

It will be seen that a very useful and easily used heating and cooling cost monitor and method are provided. Placement of the monitor where it is regularly seen, or near the thermostat, can serve as a constant reminder of the benefits of moderation in temperature control.

The above and further benefits of the invention will be better understood with reference to the following detailed description of preferred embodiments taken in consideration with the accompanying drawings.

DESCRIPTION OF THE DRAWINGS

In the drawings.

FI. 1 is a front elevational view of a temperature control cost monitor using a liquid crystal temperature display with layers partially pulled back to expose the crystals, adhesive and release paper.

DESCRIPTION OF PREFERRED EMBODIMENT

Figure 1:
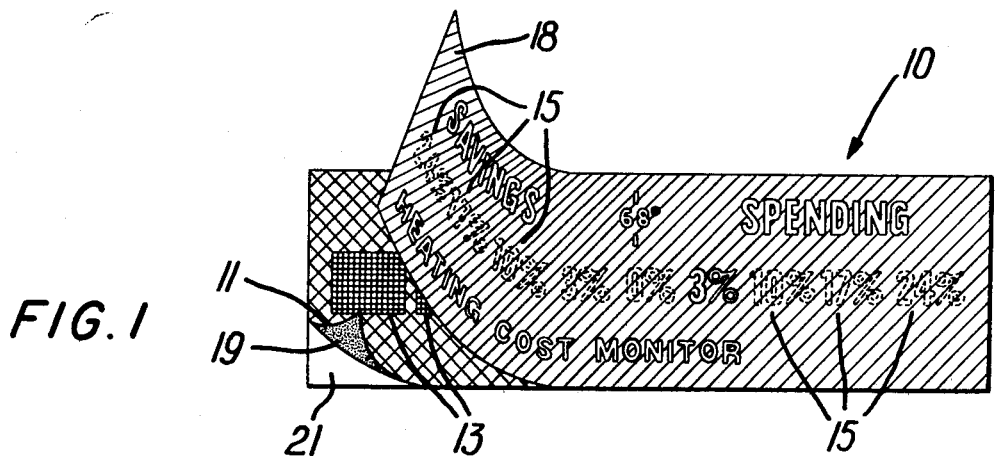

FIG. 1 illustrates a temperature control cost monitor 10 calibrated in terms of heating cost savings and excess spending respectively above and below, and relative to a 68° standard temperature. The monitor has a thin, flexible sheet 11 of plastic, paper, or other material onto which is applied thin, discrete areas 13 of temperature sensitive encapsulated liquid crystals. These are known materials, available commercially and used in thermometers that indicate, simply, room temperature. Each area 13 brightens at or near a different particular temperature by changing its color from a dark gray or black, through a deep blue to a brighter and lighter shade of green. Thus, these temperature sensitive encapsulated liquid crystals provide a temperature responsive means in that their color varies with temperature and thus also provide a visual indication which changes with temperature. These crystal areas 13 are supported on the flexible sheet 11 in a linear array that extends lengthwise along the monitor 10 in association with transparent or translucent indicia 15 on an otherwise opaque or nearly opaque flexible overlay sheet 18 of suitable plastic or the like. At a particular temperature, as one of the liquid crystal areas 13 brightens, its associated indicia 15 becomes much more visible than neighboring indicia. The array of temperature responsive liquid crystals with varying temperature dependent visible characteristics thus provide a positionally variable indication in that different positional areas 13 of the array respond to different associated temperatures. The assemblage of sheet 11, crystal areas 13 and sheet 18 is of the kind commercially available from Djinni Industries of Dayton, Ohio. These, like other thermometers, however, have heretofore been calibrated only in degrees.

In the arrangement shown in FIG. 1, a standard temperature of 68° has been selected for standard room temperature. The indicia 15 in association with that temperature is 0%. For temperatures above that, the areas 13 representing increments of temperature are calibrated in their corresponding percentages of excess fuel spending and below 68° the indicia 15 calibrate the underlying liquid crystal areas in terms of fuel cost savings.

To the same end, the indicia above and below a standard temperature can be calibrated in dollars (or the applicable monitary unit outside the United States) representing excess spending or savings. Other temperature indicators can be employed such as those with electrical digital displays.

A particularly attractive feature of the monitor 10 of FIG. 1 is that it carries an adhesive coating 19 on the back of the flexible sheet 11. The monitor, then, can easily be located where it will be regularly visible or particularly useful, for example near the thermostat. To mount the monitor 10 as desired, one peels away a strip of release paper 21 to expose the adhesive 19 and applies the monitor to a desired surface. This means that this monitor can be easily located near a thermostat or where it will be regularly seen.

Figure 2:
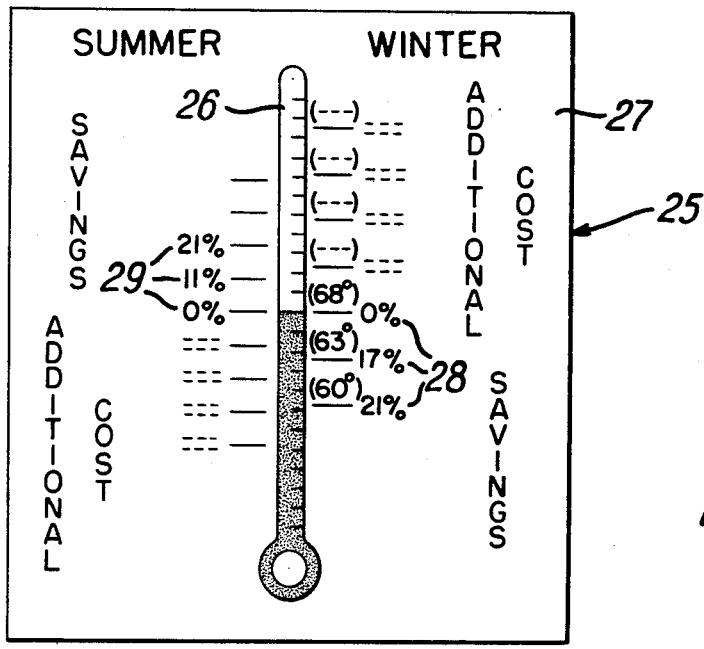
FIG. 2 is a front elevational view of a liquid height thermometer with associated indicia calibrated in terms of savings and additional cost for both heating and cooling.

FIG. 2 illustrates an alternate embodiment in which a monitor 25 includes a standard liquid height thermometer 26 carried on a display card or suitable mounting 27 marked, to the right of the thermometer, with indicia 28 to show units of savings or additional cost above and below a 68° standard temperature and representing heating cost savings and excesses for winter use. To the left of the thermometer indicia 29 are calibrated with the temperature to show air conditioning energy savings and additional costs, respectively, above and below a 68° standard temperature corresponding to 0%.

Figure 3:
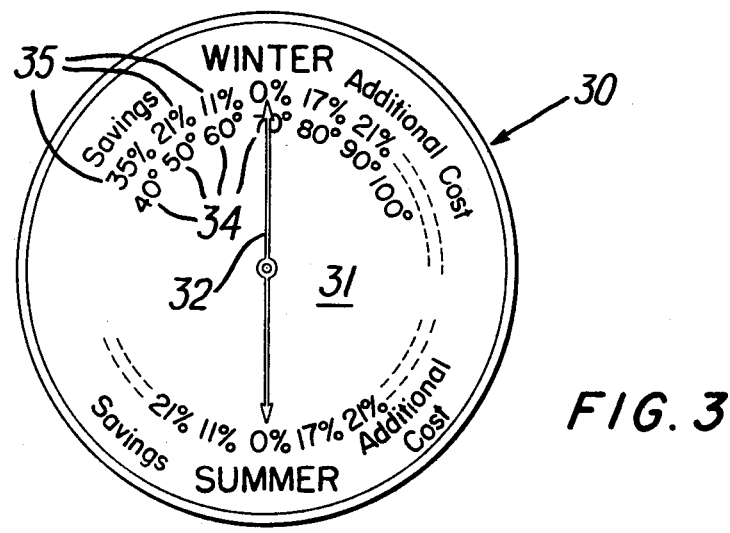
FIG. 3 is a front elevational view of a dial type thermometer face calibrated in winter and summer costs and having a double ended pointer.

In FIG. 3 a dial type thermometer 30 includes a face 31 and a double ended pointer 32. The mechanism by which the pointer 32 is moved with temperature can be any standard mechanism well known for this purpose in dial type thermometers. Numerals 34 calibrate the thermometer in degrees Fahrenheit and fuel cost savings and excesses are indicated by indicia 35 for winter use while a diametrically opposite scale at the other end of the pointer 32 indicates cooling savings and excess costs for summer.

For the purpose of calibrating the monitors 10, 25, and 30, the climate where the monitor is used is taken into account. Clearly, in North Carolina, say, the percentage cost increase or saving above and below 68° in either winter or summer will differ considerably from that in, for example, Maine. In the United States, a particularly useful breakdown has been found to be the division of the United States into three zones, Northern, Central, and Southern as shown in Chart A. The percentages above and below 68° are heating cost savings for those zones. The Northern zone includes Montana, Wyoming, North and South Dakota, Minnesota, Wisconsin, Iowa, Michigan, New York and all of New England. The Southern zone includes California, Arizona, New Mexico, Texas, Oklahoma, Arkansas, Louisiana, Mississippi, Tennessee, Alabama, North and South Carolina, Georgia and Flordia. The Central zone includes the states lying between the Northern and Southern zones. Cost savings for various temperatures are explained in the Department of Housing and Urban Development Publication "In the Bank . . . Or Up the Chimney!", Catalog No. HH 1.6/3:EN⅜.

Chart A

| | Heat Cost Savings and Excess 68° F. Standard | | | | | | | | |
|---|---|---|---|---|---|---|---|---|---|
| | 60° | 63° | 65° | 67° | 68° | 69° | 71° | 73° | 76° |
| Northern Zone | 19% | 14% | 9% | 3% | 0% | 3% | 9% | 14% | 19% |
| Central Zone | 24% | 17% | 10% | 3% | 0% | 3% | 10% | 17% | 24% |
| Southern | 35% | 25% | 15% | 5% | 0% | 5% | 15% | 25% | 35% |

Chart A-continued

| | Heat Cost Savings and Excess 68° F. Standard | | | | | | | | |
|---|---|---|---|---|---|---|---|---|---|
| | 60° | 63° | 65° | 67° | 68° | 69° | 71° | 73° | 76° |
| Zone | | | | | | | | | |

From the foregoing, it will be seen that a particularly useful monitoring arrangement has been provided capable of constantly reminding the home owner of waste or savings depending upon his thermostat setting. Although particular preferred embodiments have been described in detail above, it will be recognized that many variations in the details of the invention can be made by those skilled in the art without departure from the spirit and scope of the invention as defined in the appended claims.

I claim:

1. A temperature control cost monitor for indicating cost savings or excess including:
   temperature responsive means including an output characteristic that varies with temperature and visible means responsive to the output characteristic for providing a visible indication changing with temperature;
   means calibrating the visible means in units of savings and excess of relative energy costs below and above a preselected temperature;
   the visible means including a positionally variable indication and the means calibrating inncluding indicia associated with the positionally variable indication and indicating percentages increasing from 0% to each side of the location of the positionally variable means location of the preselected temperature;
   the visible means including the positionally variable indication comprising an array of temperature responsive liquid crystals with varying temperature-dependent visible characteristics, and the means calibrating including an overlay sheet that is at least partly light-conductive and has the indicia thereon in association with the crystal array and increasing in each direction from a preselected standard temperature.

2. The temperature control cost monitor of claim 1, wherein the indications are light conductive percentage numerals overlying the liquid crystals of the array.

3. The temperature control cost monitor of claim 1, wherein the means calibrating includes first and second means for indicating energy savings and excesses, the first means of indicating comprising heating cost indications and the second means of indicating comprising cooling cost indications.

4. The temperature control cost monitor of claim 3, wherein the liquid crystal array is supported on a first layer over which said overlay sheet is applied, and including an adhesive layer on the back of said monitor for application of the monitor to a support surface.

5. The temperature control cost monitor of claim 4, wherein the monitor includes a release paper covering sheet on the back of the monitor covering the adhesive prior to use.

6. A method of indicating temperature control cost in cost savings or excesses including:
   providing a temperature responsive indicator having a visible display that varies with temperature;

calibrating the visible means in energy cost savings and excess energy cost below and above a preselected temperature;

the temperature responsive indicator being an array of temperature sensitive liquid crystals, having varying visible characteristics with temperature; and the step of calibrating including affixing a thin overlay of sheet material to the crystal array, and including providing at least partly light transmitting cost indications in the overlay in positional association to indicate percentage of energy cost savings and increases with respect to a preselected temperature with the crystal array.

7. The method of temperature control cost indicating of claim 6, wherein the temperature responsive indicator has a positionally variable output indication; and the step of calibrating includes positioning a 0% indication proximate the position of the indication at the preselected temperature, and positioning percentage indications increasing in value above and below the preselected temperature location to indicate energy cost savings and excesses based on the preselected temperature as a standard.

8. The method of temperature control cost indicating of claim 6, wherein the step of calibrating includes providing two sets of indicia, one indicating heating cost savings and excess and the other indicating cooling cost savings and excess.

9. The method of temperature control cost indicating of claim 6, wherein the step of calibrating includes providing cost indicia for said display conforming to the climate where temperature control cost is monitored.

* * * * *

UNITED STATES PATENT AND TRADEMARK OFFICE
CERTIFICATE OF CORRECTION

PATENT NO. : 4,464,064

DATED : August 7, 1984

INVENTOR(S) : John S. D'Luzansky

It is certified that error appears in the above-identified patent and that said Letters Patent is hereby corrected as shown below:

In Column 2, line 10, "FI. 1" should read --FIG. 1--.

In Column 4, line 56, "claim 3" should read --claim 1--.

Signed and Sealed this

Eighth Day of January 1985

[SEAL]

Attest:

*Attesting Officer*

GERALD J. MOSSINGHOFF

*Commissioner of Patents and Trademarks*